US008761790B2

(12) United States Patent
Kent et al.

(10) Patent No.: US 8,761,790 B2
(45) Date of Patent: Jun. 24, 2014

(54) METHOD AND SYSTEM FOR BEST-M CQI FEEDBACK TOGETHER WITH PMI FEEDBACK

(75) Inventors: Mark Kent, Vista, CA (US); Vinko Erceg, Cardiff, CA (US); Jun Zheng, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/442,297

(22) Filed: Apr. 9, 2012

(65) Prior Publication Data
US 2012/0281773 A1 Nov. 8, 2012

Related U.S. Application Data

(62) Division of application No. 11/864,661, filed on Sep. 28, 2007, now Pat. No. 8,195,184.

(60) Provisional application No. 60/915,102, filed on Apr. 30, 2007.

(51) Int. Cl.
H04W 72/00 (2009.01)

(52) U.S. Cl.
USPC ............ 455/452.2; 455/69; 455/68; 455/126; 455/24; 370/395.2; 370/395.21; 370/395.43; 370/395.3; 370/395.31; 370/395.32; 370/395.4; 370/395.41; 370/395.42

(58) Field of Classification Search
USPC .......... 455/452.2, 69, 68, 126, 24; 370/395.2, 370/395.21, 395.3, 395.31, 395.32, 395.4, 370/395.41, 395.42, 395.43
See application file for complete search history.

(56) References Cited

U.S. PATENT DOCUMENTS

| 8,195,184 B2 | 6/2012 | Kent et al. | |
| 2010/0027697 A1* | 2/2010 | Malladi et al. | ................. 375/260 |
| 2010/0097949 A1* | 4/2010 | Ko et al. | ....................... 370/252 |

* cited by examiner

Primary Examiner — Justin Lee
(74) Attorney, Agent, or Firm — Sterne, Kessler, Goldstein & Fox P.L.L.C.

(57) ABSTRACT

Aspects of a method and system for best-M CQI feedback together with PMI feedback may include generating a plurality of feedback messages, which may be communicated from a mobile station to a base station, wherein at least one of the generated plurality of feedback messages may be associated with each corresponding selected one of a plurality of Channel Quality Indicator (CQI) reporting units. The at least one of the generated feedback messages may comprise CQI information and Pre-coding Matrix Index (PMI) information, which may both be associated with the selected one of the plurality of CQI reporting units. At least one other of the generated plurality of feedback messages may comprise an aggregate CQI information, which is based on one or more of the plurality of CQI reporting units.

20 Claims, 7 Drawing Sheets

METHOD AND SYSTEM FOR BEST-M CQI FEEDBACK TOGETHER WITH PMI FEEDBACK

CROSS-REFERENCE TO RELATED APPLICATIONS/INCORPORATION BY REFERENCE

This application is a Divisional of U.S. application Ser. No. 11/864,661, filed Sep. 28, 2007, now U.S. Pat. No. 8,195,184, issue date Jun. 5, 2012, which claims benefit to U.S. Provisional Application No. 60/915,102, filed Apr. 30, 2007.

FIELD OF THE INVENTION

Certain embodiments of the invention relate to signal processing for communication systems. More specifically, certain embodiments of the invention relate to a method and system for best-M CQI feedback together with PMI feedback.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power and bandwidth, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. As a result, some work on multiple antenna systems may be focused on systems that support single user point-to-point links, other work may focus on multiuser scenarios. Communication systems that employ multiple antennas may greatly improve the system capacity. To obtain significant performance gains using MIMO technology, it may however be desirable to supply information on the channel to the transmitter. Such channel data is called channel state information (CSI). In many wireless systems, the uplink and the downlink operate in frequency division duplex (FDD) mode, that is, the uplink and the downlink use different frequencies. When this is the case, channel measurements of the uplink may not be applicable to the downlink and vice versa. In these instances, the channel may be measured only by a signal receiver and channel state information may be fed back to the transmitter.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for best-M CQI feedback together with PMI feedback, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for adaptive best-M CQI feedback together with PMI feedback. Aspects of the method and system for best-M CQI feedback together with PMI feedback may comprise generating a plurality of feedback messages, which may be communicated from a mobile station to a base station, wherein at least one of the generated plurality of feedback messages may be associated with each corresponding selected one of a plurality of Channel Quality Indicator (CQI) reporting units. The at least one of the generated feedback messages may comprise CQI information and Pre-coding Matrix Index (PMI) information, which may both be associated with the selected one of the plurality of CQI reporting units. At least one other of the generated plurality of feedback messages may comprise an aggregate CQI information, the aggregate CQI information based on one or more of the plurality of CQI reporting units.

The aggregate CQI information may be generated based on an arithmetic mean of CQI information associated with the plurality of CQI reporting units, or on an arbitrary function of channel state information. It may be determined whether a scheduled transmission corresponds to a time-frequency interval of selected one or more CQI reporting units, and a modulation type and/or a coding type, and a pre-coding matrix, may be selected for the scheduled transmission based on the determining and on CQI information and/or PMI information associated with a plurality of CQI reporting units. The modulation type, and/or coding type, and the pre-coding matrix may be selected for the scheduled transmission based on CQI information and/or PMI information associated with the selected CQI reporting unit when the scheduled transmission corresponds to the time-frequency interval of the selected one or more CQI reporting unit. When the scheduled transmission does not correspond to the time-frequency interval of the selected one or more CQI reporting unit, the modulation type and the coding type may be selected based on an aggregate CQI information.

Figure 1A:
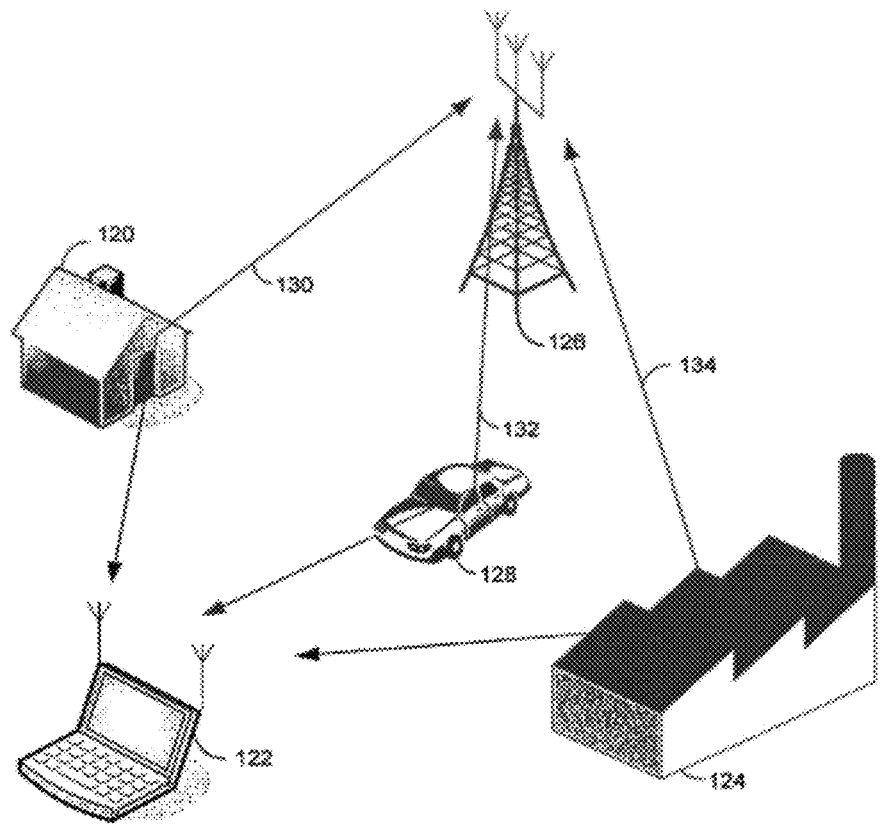
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals.

Wireless communications between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
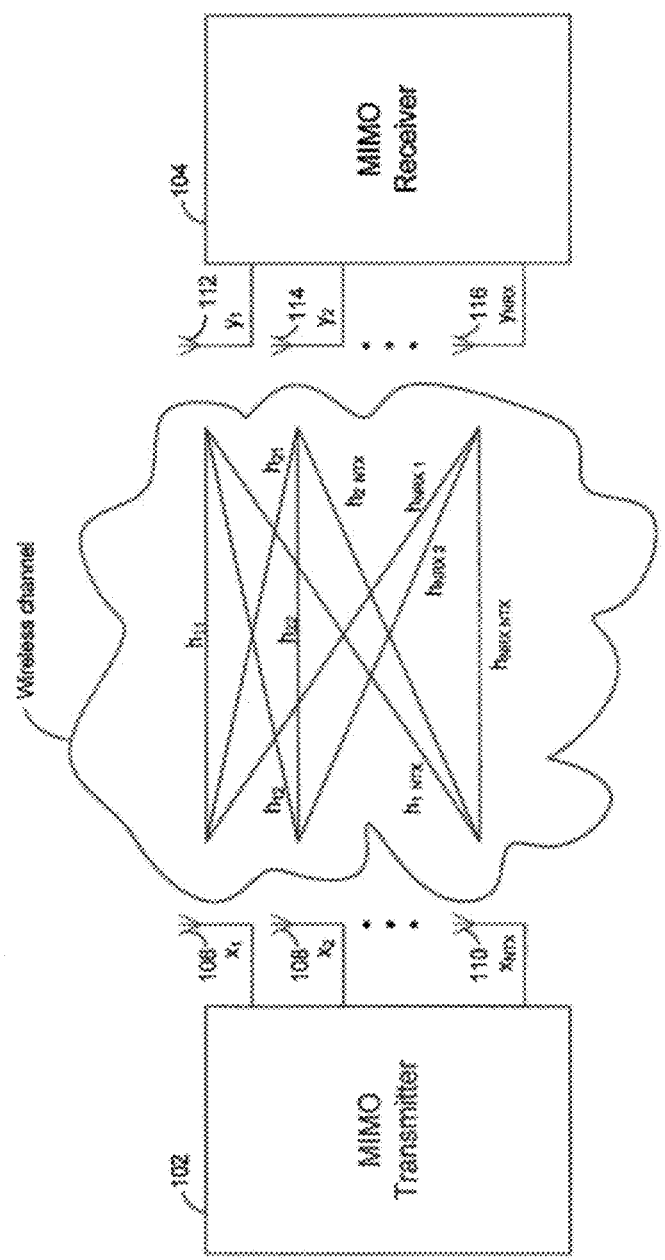
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. There is also shown a wireless channel comprising communication paths $h_{11}$, $h_{12}$, $h_{22}$, $h_{21}$, $h_{2\ NTX}$, $h_{1\ NTX}$, $h_{NRX\ 1}$, $h_{NRX\ 2}$, $h_{NRX\ NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$, $i \in \{1, 2, \ldots N_{TX}\}$ that may be transmitted by the transmit antennas, of which the antennas 106, 108 and 110 may be depicted in FIG. 1B. The MIMO receiver 104 may comprise suitable logic, circuitry and/or code that may be enabled to process the receive symbols $y_i$, $i \in \{1, 2, \ldots N_{RX}\}$ that may be received by the receive antennas, of which the antennas 112, 114 and 116 may be shown in FIG. 1B. An input-output relationship between the transmitted and the received signal in a MIMO system may be written as:

$$y = Hx + n$$

where $y = [y_1, y_2, \ldots y_{N_{RX}}]^T$ may be a column vector with $N_{RX}$ elements, $.^T$ may denote a vector transpose, $H = [h_{ij}]: i \in \{1, 2, \ldots N_{RX}\}$; $j \in \{1, 2, \ldots N_{TX}\}$ may be a channel matrix of dimensions $N_{RX}$ by $N_{TX}$, $x = [x_1, x_2, \ldots x_{N_{TX}}]^T$ is a column vector with $N_{TX}$ elements and n is a column vector of noise samples with $N_{RX}$ elements. The channel matrix H may be written, for example, as $H = U\Sigma V^H$ using the Singular Value Decomposition (SVD), where $.^H$ denotes the Hermitian transpose, U is a $N_{RX}$ by $N_{TX}$ unitary matrix, $\Sigma$ is a $N_{TX}$ by $N_{TX}$ diagonal matrix and V is $N_{TX}$ by $N_{TX}$ unitary matrix. Other matrix decompositions that may diagonalize or transform the matrix H may be used instead of the SVD. If the receiver algorithm implemented in MIMO receiver 104 is, for example, an Ordered Successive Interference Cancellation (OSIC), other matrix decompositions that convert the matrix H to lower/upper triangular may be appropriate. One such decomposition may comprise Geometric Mean Decomposition (GMD), where $H = QRP^H$, where R may be upper triangular with the geometric mean of the singular values of H on the diagonal elements, and Q and P may be unitary.

Figure 2:
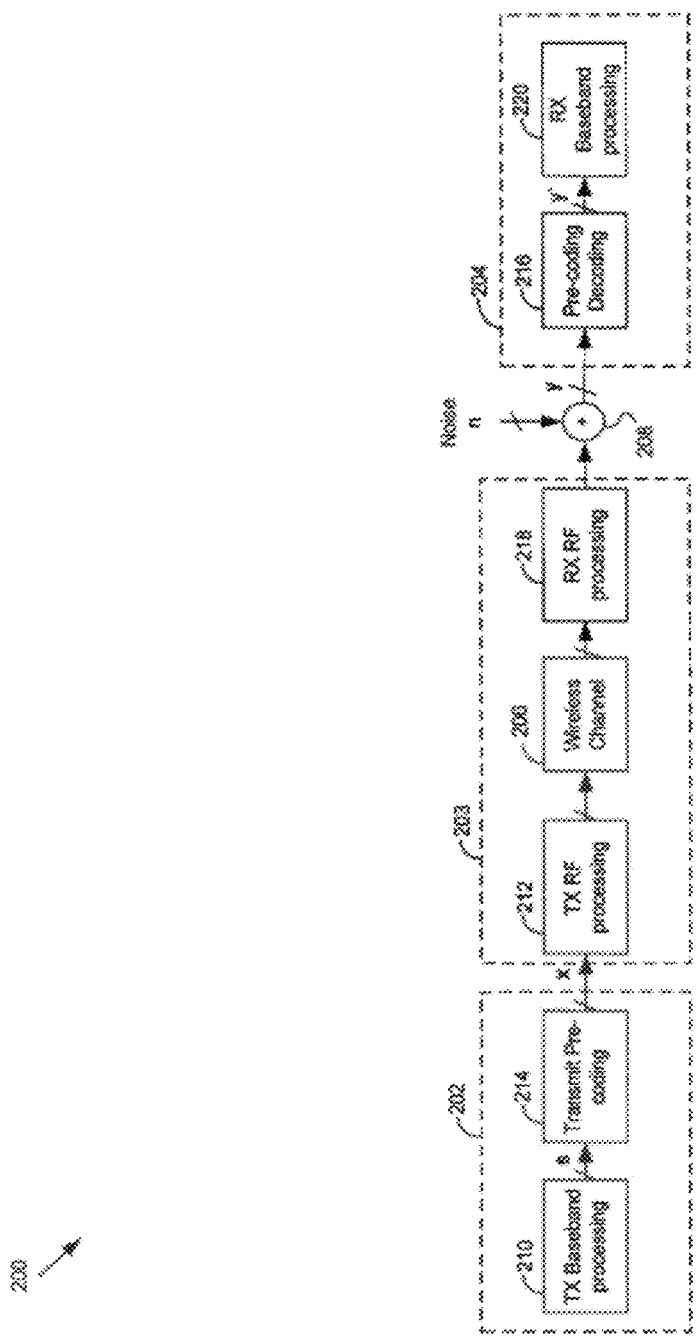
FIG. 2 is a block diagram illustrating an exemplary MIMO transceiver chain model, in accordance with an embodiment of the invention.

FIG. 2 is a block diagram illustrating an exemplary MIMO transceiver chain model, in accordance with an embodiment of the invention. Referring to FIG. 2, there is shown a MIMO system 200 comprising a MIMO transmitter 202, a MIMO baseband equivalent channel 203, a MIMO receiver 204, and an adder 208. The MIMO transmitter 202 may comprise a transmitter (TX) baseband processing block 210 and a transmit pre-coding block 214. The MIMO baseband equivalent channel 203 may comprise a wireless channel 206, a TX radio frequency (RE) processing block 212 and a receiver (RX) RF processing block 218. The MIMO receiver 204 may comprise a pre-coding decoding block 216 and a RX baseband processing block 220. There is also shown symbol vector s, pre-coded vector x, noise vector n, received vector y and channel-decoded vector y'.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214. A baseband signal may be suitably coded for transmission over a wireless channel 206 in the transmit pre-coding block 214 that may comprise suitable logic, circuitry and/or code that may enable it to perform these functions. The TX RF processing block 212 may comprise suitable logic, circuitry and/or code that may enable a signal communicated to the TX RF processing block 212 to be modulated to radio frequency (RF) for transmission over the wireless channel 206. The RX RF processing block 218 may comprise suitable logic, circuitry and/or code that may be enabled to perform radio frequency front-end functionality to receive the signal transmitted over the wireless channel 206. The RX RF processing block 218 may comprise suitable logic, circuitry and/or code that may enable the demodulation of its input signals to baseband. The adder 208 may depict the addition of noise to the received signal at the MIMO receiver 204. The MIMO receiver 204 may comprise the pre-coding decoding block 216 that may linearly decode a received signal and communicate it to the RX baseband processing block 220. The RX baseband processing block 220 may comprise suitable logic, circuitry and/or logic that may enable to apply further signal processing to baseband signal.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214 and may be the symbol vector s. The symbol vector s may be of dimension $N_{TX}$ by 1.

The transmit pre-coding block 214 may be enabled to apply a linear transformation to the symbol vector s, so that $x = Ws$, where W may be of dimension $N_{TX}$ by length of s, and $x = [x_1, x_2, \ldots x_{N_{TX}}]^T$. Each element of the pre-coded vector x may be transmitted on a different antenna among $N_{TX}$ available antennas.

The transmitted pre-coded vector x may traverse the MIMO baseband equivalent channel 203. From the $N_{RX}$ receiver antennas, the received signal y may be the signal x transformed by the MIMO baseband equivalent channel 203 represented by a matrix H, plus a noise component given by the noise vector n. As depicted by the adder 208, the received vector y may be given by $y = Hx + n = HWs + n$. The received vector y may be communicated to the pre-coding decoding block 216, where a linear decoding operation B may be applied to the received vector y to obtain the decoded vector $y' = B^H y = B^H HWs + B^H n$, where B may be a complex matrix of appropriate dimensions. The decoded vector y' may then be communicated to the RX baseband processing block 220 where further signal processing may be applied to the output of the pre-coding decoding block 216.

If the transfer function H of the MIMO baseband equivalent channel 203 that may be applied to the transmitted pre-coded vector x is known both at the MIMO transmitter 202 and the MIMO receiver 204, the channel may be diagonalized by, for example, setting $W = V$ and $B = U$, where $H = U\Sigma V^H$ may be the singular value decomposition. In these instances, the channel decoded vector y' may be given by the following relationship:

$$y' = U^H U \Sigma V^H V s + U^H n = \Sigma s + U^H n$$

Since $\Sigma$ may be a diagonal matrix, there may be no interference between the elements of symbol vector s in y' and hence the wireless communications system may appear like a system with up to N parallel single antenna wireless communication systems, for each element of s, up to the rank of channel matrix H which may be less or equal to $N_{TX}$. The operation of applying the matrix W to the vector s may be referred to as pre-coding. The operation of making the wireless system appear like a system of parallel non-interfering data streams due to the use of multiple antennas, may lead to the use of the term spatial data streams since each data stream may originate on different transmit antennas. The number of spatial data streams $1 \leq N_S \leq \min\{N_{TX}, N_{RX}\}$ that may be separated or decoupled may be limited by the rank r of the channel matrix H, as described above. Each spatial stream originating at a transmit antenna may be modulated and coded separately.

Figure 3:
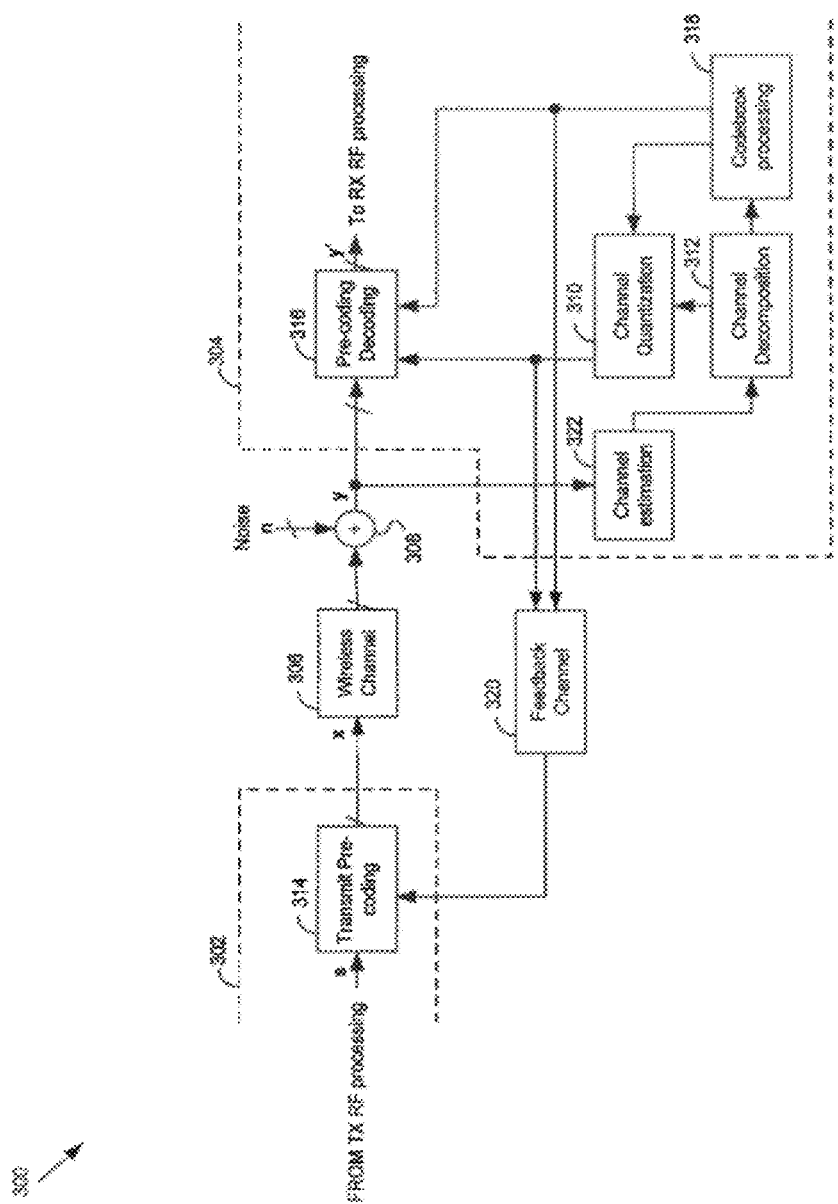
FIG. 3 is a block diagram of an exemplary MIMO with finite rate channel state information feedback, in accordance with an embodiment of the invention.

FIG. 3 is a block diagram of an exemplary MIMO with finite rate channel state information feedback, in accordance with an embodiment of the invention. Referring to FIG. 3, there is shown a MIMO system 300, comprising a partial MIMO transmitter 302, a partial MIMO receiver 304, a Wireless channel 306, an adder 308, and a feedback channel 320. The partial MIMO transmitter 302 may comprise a transmit pre-coding block 314. The partial MIMO receiver 304 may comprise a pre-coding decoding block 316, a channel estimation block 322, a channel quantization block 310, a channel decomposition block 312, and a codebook processing block 318. There is also shown a symbol vector s, a pre-coded vector x, a noise vector n, a received vector y, and a decoded vector y'.

The transmit pre-coding block 314, the wireless channel 306, the adder 308 and the pre-coding decoding block 316 may be substantially similar to the transmit pre-coding block 214, the MIMO baseband equivalent channel 203, the adder 208 and the pre-coding decoding block 216, illustrated in FIG. 2. The channel estimation block 322 may comprise suitable logic, circuitry and/or logic to estimate the transfer function of the wireless channel 206. The channel estimate may be communicated to the channel decomposition block 312, which may comprise suitable logic, circuitry and/or code, which may be enabled to decompose the channel. In this regard, the decomposed channel may be communicated to the channel quantization block 310. The channel quantization block 310 may comprise suitable logic, circuitry and/or code, which may be enabled to partly quantize the channel onto a codebook. The codebook processing block 318 may comprise suitable logic, circuitry and/or logic, which may be enabled to generate a codebook. The feedback channel 320 may represent a channel that may be enabled to carry channel state information from the partial MIMO receiver 304 to the partial MIMO transmitter 302.

In many wireless systems, the channel state information, that is, knowledge of the channel transfer matrix H, may not be available at the transmitter and the receiver. However, in order to utilize a pre-coding system as illustrated in FIG. 2, it may be desirable to have at least partial channel knowledge available at the transmitter. In the exemplary embodiment of the invention disclosed in FIG. 2, the MIMO transmitter 302 may require the unitary matrix V for pre-coding in the transmit pre-coding block 214 of MIMO transmitter 202.

In frequency division duplex (FDD) systems, the frequency band for communications from the base station to the mobile terminal, downlink communications, may be different from the frequency band in the reverse direction, uplink communications. Because of a difference in frequency bands, a channel measurement in the uplink may not generally be useful for the downlink and vice versa. In these instances, the measurements may only be made at the receiver and channel state information (CSI) may be communicated back to the transmitter via feedback. For this reason, the CSI may be fed back to the transmit pre-coding block 314 of the partial MIMO transmitter 302 from the partial MIMO receiver 304 via the feedback channel 320. The transmit pre-coding block 314, the wireless channel 306, and the adder 308 are substantially similar to the corresponding blocks 214, 203 and 208, illustrated in FIG. 2. At the partial MIMO receiver 304, the received signal y may be used to estimate the channel transfer function H by $\hat{H}$ in the channel estimation block 322. The estimate may further be decomposed into, for example, a diagonal or triangular form, depending on a particular receiver implementation, as explained for FIG. 2. For example, the channel decomposition block 312 may perform an SVD: $\hat{H}=\hat{U}\hat{\Sigma}\hat{V}^H$. In the case of a plurality of antennas, the dimensions of the matrices U, Σ and V may grow quickly. In these instances, it may be desirable to quantize the matrix $\hat{V}$ into a matrix $V_q$ of dimensions $N_{TX}$ by $N_{TX}$, where $V_q$ may be chosen from pre-defined finite set of unitary matrices $C=\{V_i\}$. The set of unitary matrices C may be referred to as the codebook. By finding a matrix $V_q$ from the codebook that may be, in some sense, closest to the matrix $\hat{V}$, it may suffice to transmit the index q to the transmit pre-coding block 314 via the feedback channel 320 from the channel quantization block 310, if the partial MIMO transmitter 302 may know the codebook C. The codebook C may be varying much slower than the channel transfer function H and it may suffice to periodically update the codebook C in the transmit pre-coding block 314 from the codebook processing block 318 via the feedback channel 320. The codebook C may be chosen to be static or adaptive. Furthermore, the codebook C may also be chosen, adaptively or non-adaptively, from a set of codebooks, which may comprise adaptively and/or statically designed codebooks. In these instances, the partial MIMO receiver 304 may inform the partial MIMO transmitter 302 of the codebook in use at any given instant in time. Hence, the channel H may be estimated in the channel estimation block 322 and decomposed in the channel decomposition block 312.

In the channel quantization block 310, a matrix, for example $\hat{V}$ may be quantized into a matrix $V_q$ and the index q may be fed back to the partial MIMO transmitter 302 via the feedback channel 320. The codebook C may also be chosen time invariant. Furthermore, the codebook C may also be chosen, adaptively or non-adaptively, from a set of codebooks, which may comprise adaptively and/or statically designed codebooks, as described above. Less frequently than the index q, the codebook C from the codebook processing block 318 may be transmitted to the partial MIMO transmitter 302 via the feedback channel 320. To feedback the index q, M bits may suffice when the cardinality |C| of the codebook C may be less or equal to $|C| \leq 2^M$.

The transmit pre-coding block 314 may perform, for example, the linear transformation $x=V_q s$. The pre-coding decoding block 316 at the receiver may implement the linear transformation $y'=\hat{U}^H y$. In some instances, the rank r of the channel matrix H may be less than the number of transmit antennas $r \leq N_{TX}$. In these instances, it may be desirable to map a reduced number of spatial streams into the vector x, as described for FIG. 2. For example, the vector s may be chosen, so that x=Ws, where W may be of dimension $N_{TX}$ by the length of s and the length of s may be the number of spatial streams, generally smaller than the rank r. The matrix W may be constructed, for example, from a desirable choice of columns from $V_q$. In another embodiment of the invention, the vector x may be generated from $x=V_q s$, as described above, and some suitably chosen elements of the vector s of length $N_{TX}$ may be set to zero, so that generally the non-zero elements in the vector s may be less than the rank r. In these instances, the elements in s that may be set to zero may correspond to non-utilized spatial streams. The feedback of the index q, and associated information, may be referred to as Pre-Coding Matrix Index (PMI) information.

In some instances, it may be possible that the different spatial streams may experience significantly different channel conditions. For example, an attenuation coefficient of one spatial stream may be significantly different from an attenuation coefficient of another spatial stream. For example, the Signal-to-Noise Ratio (SNR) or another performance measure may differ between the spatial streams. Accordingly, the modulation and/or coding of each spatial stream may be adapted independently. Adapting the modulation format and the coding rate for each spatial stream (by adapting the transmitted symbols, for example) may be enabled by feeding back channel state information and/or channel-based information from the MIMO receiver 304 to the MIMO transmitter 302 via the feedback channel 320. Feedback information that may be utilized to determine suitable modulation and coding protocols for the transmit data may be referred to as Channel Quality Indicator (CQI) information. In accordance with various embodiments of the invention, the CQI information may be, for example, a Signal-to-Noise-and-Interference Ratio (SINR) that may be mapped to a suitable modulation and coding configuration. In another embodiment of the invention, the MIMO receiver 304 may directly feedback a desirable modulation and coding configuration, based on estimated channel quality, for example.

The modulation and coding for each spatial stream may be chosen from a modulation coding set (MCS), which may comprise combinations of modulation constellations and coding rates that may be employed by the partial MIMO transmitter 302. For example, the modulation may be chosen from, but is not limited to, QPSK, 16QAM or 64QAM, where QPSK may denote quadrature phase shift keying and K-QAM may denote quadrature amplitude modulation with K constellation points. A coding rate may be chosen to be, for example, $\frac{1}{3}$, $\frac{1}{5}$ or $\frac{3}{4}$, whereby any rational number smaller than 1 may be feasible. A modulation coding set may comprise elements that may be formed by combining a modulation type with a coding rate. An exemplary element of a modulation coding set may be 'QPSK $\frac{1}{3}$', which may denote a QPSK modulation with a coding rate of $\frac{1}{3}$. An MCS may comprise N elements. In this case, the MCS may be referred to as an N-level MCS. In order to select an element from an N-level MCS at the partial MIMO receiver 304 and feed back the index indicating the appropriate element in the MCS from the partial MIMO receiver 304 to the partial MIMO transmitter 302 via the feedback channel 320, $B \geq \log_2(N)$ bits of feedback may be required per spatial stream.

In order to reduce the number of bits required for feedback, a differential scheme may be implemented. In these instances, $B \geq \log_2(N)$ bits may be transmitted for the spatial stream 1, for example, to transmit an index to an element of the MCS, as described above. The parameter $s_k$ may denote an MCS feedback value for spatial stream k. For the spatial streams 2 though $N_S$, an index offset value $s_k$ may be fed back from the partial MIMO receiver 304 to the partial MIMO transmitter 302. Such an offset value may, for example, take the values $s_k \in \{0, \pm1, \pm2, \pm3\}$: k=2, ..., $N_S$. In this exemplary case, for spatial stream 2 through $N_S$, $B_d$=3 bits of feedback may be sufficient to feed back an offset value $s_k$: k≠1. The required index to the MCS for spatial stream k may then be obtained from the feedback value for spatial stream 1 and the offset $s_k$. The index q(k) may denote the index of the desired element in the MCS for user k. Hence, applying the above procedure, the partial MIMO transmitter 302 may determine the indices q(k) according to the following relationship:

$q(j)=s_j$: requiring $B \geq \log 2(N)$ feedback bits $q(k)=q(j)+s_k$: $\forall k \neq j, B_d$ feedback bits required for $s_k$ (1)

where j=1 may be as chosen above. The index j may be chosen to correspond to an arbitrary spatial stream, such that $j \in \{1, 2, ..., N_S\}$. For ease of exposition and clarity, j=1 may be assumed in the following description. When $B_d < B$, the number of bits that may be fed back from the partial MIMO receiver 304 to the partial MIMO transmitter 302 may be reduced. In some instances, due to a reduction in the number of feedback bits, the range of indices q(k) that may be addressed by q(k):k≠j may be limited to a subset of the MCS, since the addressable elements in the MCS and their associated indices q(k) may depend on the value $s_j=s_1$.

A further reduction in the number of feedback bits may be achieved by using a differential scheme also for spatial stream j=1. This may be done in instances where the channel conditions vary slowly enough to enable differential tracking of the new index based on an offset value added to the last instance of the index value. In this case, the index at time n for user k may be defined by the following relationship:

$q_0(j)=s_j$: requiring $B \geq \log 2(N)$ feedback bits $q_n(j)=q_{n-1}(j)+s_j$: $B_d$ feedback bits required $q_n(k)=q_n(j)+s_k$: $\forall k \neq j, B_d$ feedback bits required (2)

In this case, hence, the initial index for the spatial stream j=1 may be fed back using B bits, which may address any element in the MCS. For subsequent indices the channel may change slowly enough so that the previous index $q_{n-1}(j)$ may be used to determine the new index $q_n(j)$. It may be desirable to reinitialize $q_n(j)$ occasionally.

It may be desirable to choose an appropriate number of levels for the MCS. In principle, N, the number of elements or levels of an N-level MCS, may be chosen to be any positive integer. However, since the index to an element of an N-level MCS may be fed back from the partial MIMO receiver 304 to the partial MIMO transmitter 302, it may be efficient to choose N as a power of 2. Furthermore, it may be undesirable to use both many and few levels. With few levels, the MCS may be relatively coarse, which may lead to a selection of a level that may be inefficient for the given channel conditions. On the other hand, an MCS with a large number of levels may provide a highly efficient match between the channel conditions and the selected level in the MCS. It may take comparatively long until the system settles, that is, the transient phase, also referred to as settling time, may be long. In addition, with a large number of levels, the differential protocol for the spatial streams 2 through $N_S$ introduced above, may potentially result in a small dynamic range, which may be undesirable.

Figure 4:
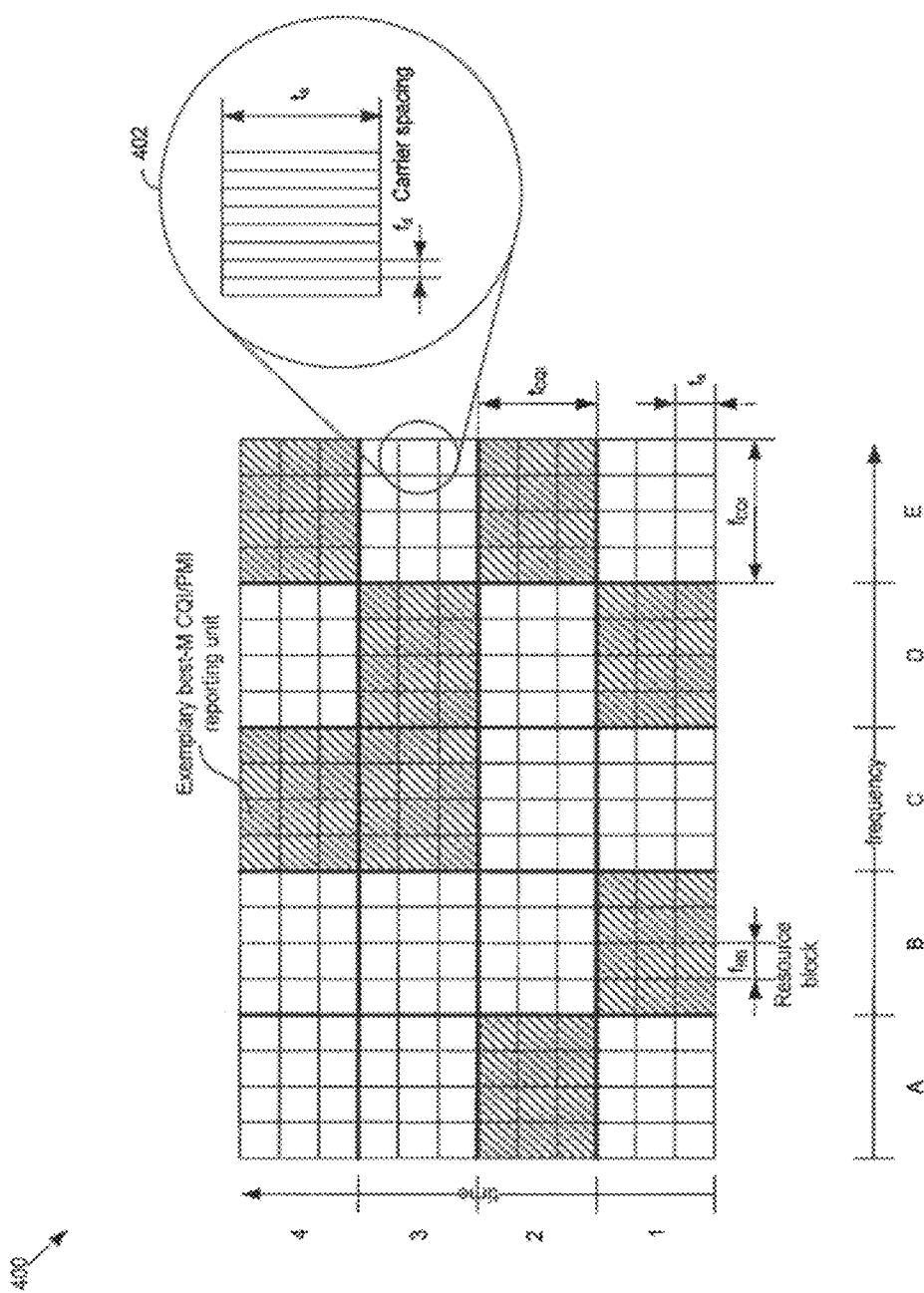
FIG. 4 is a time-frequency diagram illustrating a time-frequency wireless channel, in accordance with an embodiment of the invention.

FIG. 4 is a time-frequency diagram illustrating a time-frequency wireless channel, in accordance with an embodiment of the invention. Referring to FIG. 4, there is shown a time-frequency diagram 400, comprising a detail blow-up 402. The frequency axis may be divided into several exemplary sub-divisions, for example A through E as illustrated in FIG. 4. A sub-band may be given by a bandwidth $f_{CQI}$. A sub-band may comprise, for example, one or more resource blocks of bandwidth $f_{RB}$. A resource block may comprise a bandwidth comprising one or more carrier spacings of bandwidth $f_{cb}$ as illustrated in the detail blow-up 402. In an Orthogonal Frequency Division Multiplexing (OFDM) system, for example, the carrier spacing may be given by the bandwidth of a tone and/or between tones. A CQI/PMI reporting unit may comprise a bandwidth $f_{CQI}$.

The time axis may be sub-divided, similar to the frequency axis, into exemplary sub-divisions 1 through 4, as illustrated in FIG. 4. There is shown a $t_{CQI}$ and a $t_s$ subdivision. $t_{CQI}$ may be a reporting interval between CQI/PMI feedback messages. $t_s$ may be a more fundamental time unit, for example, a channel sampling time. A CQI/PMI reporting unit may be defined as representing a time-frequency slide of the time-frequency wireless channel, for example of dimension $t_{CQI}$ by $f_{CQI}$. Referring to FIG. 4, there is also shown a plurality of best-M CQI/PMI time-frequency reporting units, marked by a hatched pattern.

In the description of the wireless channel for FIG. 2, the wireless channel for a MIMO system may be described by a channel matrix H. However, the matrix H may represent the channel between a transmit and a receive antennas by a scalar, as may be see from the channel model describing the matrix H: H=[hij]: $i \in \{1, 2, ... N_{RX}\}$, $j \in \{1, 2, ... N_{TX}\}$. The wireless channel, in general, may be a function of time and frequency and may be approximately constant only over a small area of the time-frequency plane. This area may be determined by the channel conditions, for example the channel coherence bandwidth and the channel coherence time. These variables may be determined by a variety of environmental factors, for example, Doppler spread due to movements. Hence, the channel matrix may be function of both time and frequency and may be written more accurately as $H(f,t)=[hij(f,t)]:i \in \{1, 2, \ldots N_{RX}\}, j \in \{1, 2, \ldots N_{TX}\}$. For notational simplicity, the time and frequency dependency is not shown, however. With regard to FIG. 4, in some instances a matrix H may be measured for each time-frequency slice of area $t_s$ by $f_d$, as illustrated in the detail blow-up 402. In an OFDM system, such a channel matrix H may correspond to a channel estimate of a single OFDM sub-carrier, also referred to as a tone, in a sampling interval of length $t_s$. Clearly, since a channel measurement H may be made for each unit of area $t_s$ by $f_d$ of the wireless time-frequency channel, a large amount of channel data may be available. However, since feedback capacity from the MIMO receiver 304 to the MIMO transmitter 302 via the feedback channel 320 may be limited, it may be necessary to reduce the resolution of the channel feedback messages and report channel measurements that may be a function of a number of channel measurements. Similarly, in order to reduce the rate at which feedback messages may be sent back to the MIMO transmitter 302, the feedback messages may be sent only every multiple of, for example, the sampling time $t_s$. The resolution may be reduced, for example, by averaging the measured channel matrices H in time and frequency over the reporting area in the time-frequency plane, as illustrated for CQI/PMI reporting units in FIG. 4.

In one exemplary embodiment of the invention illustrated in FIG. 4, a CQI/PMI reporting block may comprise a bandwidth of $f_{CQI}$, which may comprise, for example, four Resource blocks of bandwidth $f_{RB}$. As shown in the detail blow-up 402, the Resource block may comprise, for example 8 carrier spacing blocks of bandwidth $f_d$ each. In the time dimension, the CQI/PMI reporting unit may comprise a time interval of $t_{CQI}$, which may, for example, comprise 3 sampling periods $t_s$. Hence, as illustrated in FIG. 4, the entire available bandwidth may be divided into 5 sub-bands, for example A trough E, and a CQI/PMI reporting unit may be defined for each sub-band and period $t_{CQI}$, for example as illustrated in grid positions A1, A2, . . . B1, B2, . . . etc. in FIG. 4. The CQI/PMI reporting unit may be associated with one or more values that may be a function of the channel measurements obtained for the time-frequency slice covered by the CQI/PMI reporting unit. For example, an average SINR over the time and frequency slice of the CQI/PMI reporting unit may be computed to determine an appropriate average coding and modulation level to be fed back, and may be associated with a CQI value. Similarly, a suitable measure for feedback may be determined for the PMI feedback message. For example, an average matrix H' may be computed from the measured matrices H covered by the time-frequency slide of the PMI reporting unit. In another embodiment of the invention, the measured matrix H for a centrally placed time-frequency slice may be fed back, averaged over time, for example. Hence, to reduce feedback requirements, a plurality of channel measurements H may be processed into two sets of values, a set regarding CQI feedback and a set regarding PMI feedback.

In order to reduce feedback requirements, only a selection of CQI/PMI reporting units may feed back from the MIMO receiver 304 to the MIMO transmitter 302. In accordance with an embodiment of the invention, the CQI/PMI reporting units with the M best CQI values (referred to as best-M CQI) may feed back, where M may be a variable and 'best' may be defined in terms of some performance measure. For example in FIG. 4, in the time interval 1, CQI/PMI reporting blocks B and D may be the best-2 CQI reporting units, for example, the CQI/PMI reporting units associated with the highest SINR. In this example, the CQI/PMI reporting blocks A1, B1, C1, D1 and E1 may compute CQI values according to some function that may be based on channel measurements. With M=2, 2 desirable CQI/PMI reporting units according to some measure, exemplary reporting units B1 and D1 marked in hatched, may be selected and fed back. The other CQI/PMI reporting units, in the instance A1, C1, and E1, may not feed back information in time interval 1. In addition, the PMI value associated with the best-M CQI reporting units, for example B1 and D1 may also be transmitted.

In addition to the feedback associated with the M selected CQI/PMI reporting units, for example B1 and D1, a CQI aggregate value may also be fed back. In particular, since the CQI/PMI values of, for example, the reporting units A1, C1 and E1 may not be fed back, a CQI aggregate value may be computed and fed back. The CQI aggregate value may be, for example, an average based on the CQI values computed for the CQI/PMI reporting units A1, B1, C1 D1 and E1. The CQI aggregate value may, however, not be limited to an average but may be derived from an arbitrary function that may use any data. In the present example, for 5 CQI/PMI reporting units that may cover the entire bandwidth, 2 CQI values and associated PMI values may be fed back. In addition, a CQI aggregate value may also be fed back, as described above. Similarly, as illustrated in FIG. 4, at time interval 2, 3, and 4, CQI/PMI reporting units A2 and E2, C3 and D3, and C4 and E4 may be selected for feedback by the best-M approach, respectively.

The CQI/PMI reporting unit may be arbitrarily sized, in accordance with an embodiment of the invention. In addition, the CQI/PMI reporting unit dimensions may be adjusted dynamically, for example as a function of the available feedback capacity and/or the channel conditions. Similarly, the dimensions of the sub-divisions in time and/or frequency may be chosen arbitrarily. For example, in one embodiment of the invention, a resource block may comprise 12 OFDM tones. The generation of the CQI/PMI messages may not be limited to averages and may be any arbitrary function that may be at least a function of channel conditions and/or channel measurements.

In another embodiment of the invention, the CQI/PMI reporting units may be variably sized in frequency. In other words, a CQI/PMI reporting unit may be of different size, depending on the absolute frequency. For example, an entire channel may be 5 MHz wide. In accordance with an embodiment of the invention, a first CQI/PMI reporting unit may cover the bandwidth from 0-1 MHz. A second CQI/PMI reporting unit may cover the bandwidth from 1-4.5 MHz. A third CQI/PMI reporting unit may cover the bandwidth from 4.5-5 MHz. In some instances, neighboring PMI/CQI reporting units may also overlap in frequency.

At the MIMO transmitter, for example MIMO transmitter 302, the received CQI and PMI feedback values may be used to select desirable modulation and coding levels and perform pre-coding, respectively. Generally, a user may be scheduled for a certain transmission bandwidth on the downlink. For example, if a downlink transmission from MIMO transmitter 302 to downlink receiver 304 may be scheduled by the base station to occur in frequency band B at time 1, the MIMO transmitter 302 may be able to utilize the CQI and PMI feedback associated with time-frequency block B1 for transmit purposes, since B1 and D1 may have been selected for feedback in the best-M protocol, as illustrated by the hatched pattern in FIG. 4. However, in some instances, the scheduled time-frequency transmission slot may not coincide with a CQI/PMI reporting unit that may have been selected for feeding back its CQI and PMI values, due to the best-M selection protocol. For example, in time interval 1, a transmission may be scheduled in time-frequency slot A1. In this instance, the MIMO transmitter 302 may use the CQI aggregate value to determine a desirable modulation and coding level since a CQI level for the CQI/PMI reporting unit at time-frequency instance C1 may not have been fed back.

With regard to the PMI feedback information that may be required at the MIMO transmitter 302 for pre-coding of time-frequency transmission in A1, PMI feedback information from the nearest best-M CQI/PMI reporting unit may be used, wherein nearest may be defined in terms of some distance measure. For example, the distance measure may be distance in frequency. In this instance, the nearest best-M CQI/PMI reporting unit to A1 may be B1 and hence the PMI information fed back from B1 may be used. In another embodiment of the invention, the PMI information may be generated by interpolation. For example, if a transmission may be scheduled to occur in time-frequency slot C2, the nearest best-M CQI/PMI reporting units that may have fed back PMI information may be A2 and E2, both of which may be 'far', as measured by a frequency distance measure. In this case, it may be desirable to use an interpolated pre-coding matrix based on the pre-coding matrices associated with the PMI feedback information from both best-M CQI/PMI reporting units A2 and E2. In the more general case, a pre-coding matrix for a non-best-M time-frequency slot may be determined by interpolating between the pre-coding matrices associated with the nearest best-M CQI/PMI reporting units, according to some distance measure. The distance measure that may be employed may be frequency and/or time or any arbitrary distance measure. Similarly, the interpolation algorithm that may be used to interpolate between pre-coding matrices may be arbitrary.

Figure 5:
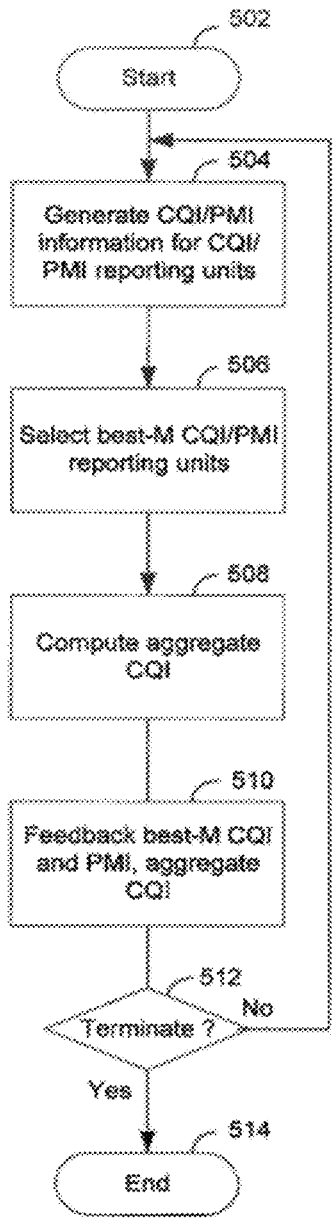
FIG. 5 is a flow chart illustrating an exemplary best-M CQI/PMI feedback process with aggregate CQI, in accordance with an embodiment of the invention.

FIG. 5 is a flow chart illustrating an exemplary best-M CQI/PMI feedback process with aggregate CQI, in accordance with an embodiment of the invention. In step 504, information associated with the CQI and PMI feedback may be generated for CQI/PMI reporting units. This may, for example, comprise SINR values, which may be the relevant CQI information, associated with the CQI/PMI reporting units. Based on some performance measure applied to the CQI information associated to the CQI/PMI reporting unit, M desirable CQI/PMI reporting units may be chosen for feedback in step 506. In step 508, an aggregate CQI may be computed from one or more CQI values associated with CQI/PMI reporting units. In step 510, the aggregate CQI, and the CQI and PMI values of the best-M CQI/PMI reporting units may be fed back, for example from the MIMO receiver 304 to the MIMO transmitter 302. In step 512, the loop may return to the start or terminate.

Figure 6:
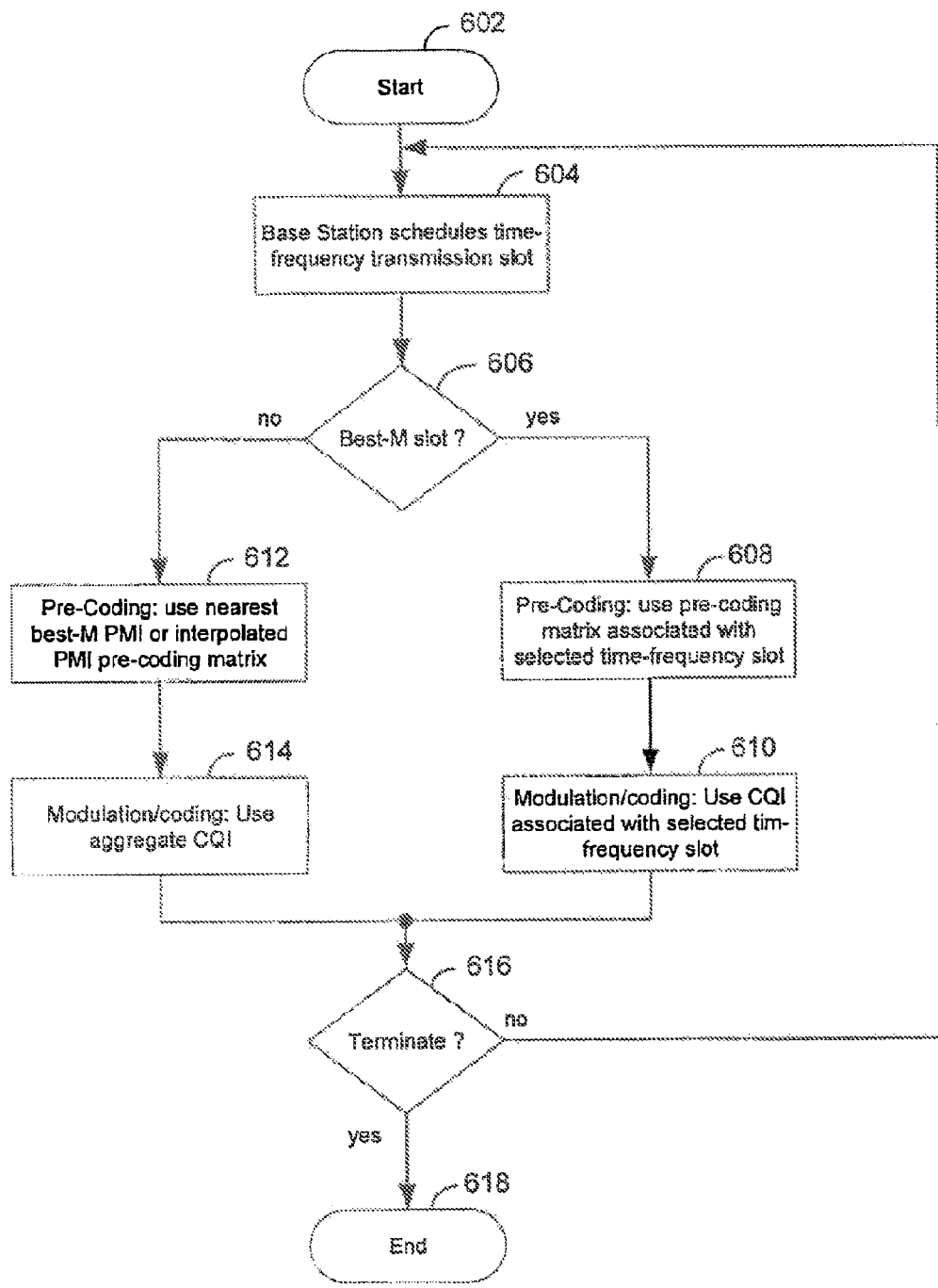
FIG. 6 is a flow chart illustrating an exemplary utilization of the PMI/CQI feedback at a MIMO transmitter as a function of scheduling, in accordance with an embodiment of the invention.

FIG. 6 is a flow chart illustrating an exemplary utilization of the PMI/CQI feedback at a MIMO transmitter as a function of scheduling, in accordance with an embodiment of the invention. At the MIMO transmitter 304, for example a base station, the transmissions may generally be scheduled. Each transmission may be assigned a time-frequency slot, for example B2, as illustrated in FIG. 4. In step 604, the base station may schedule the transmissions for one or more transmissions. In step 606, if a scheduled transmission for a particular transmission, for example a particular user, falls into a time-frequency slot that may be associated with a best-M CQI/PMI feedback, the CQI and PMI feedback information associated with the scheduled/best-M time-frequency slot may be used for precoding and to determine desirable modulation and coding for the transmission, as shown in steps 608 and 610. If a scheduled transmission for a particular transmission, for example a particular user, falls into a time-frequency slot that may not be associated with a best-M CQI/PMI feedback, the aggregate CQI feedback value may be used to determine desirable modulation and coding for the transmission, as shown in step 614.

In step 612, in addition, pre-coding may be achieved by using, for example, the pre-coding matrix associated with the PMI feedback of the nearest best-M CQI/PMI reporting units, as described for FIG. 4. The nearest best-M CQI/PMI reporting unit to the scheduled time-frequency slot may be determined based on an arbitrary distance function, which may be a distance function of frequency and/or time, for example. In accordance with various embodiments of the invention, it may be desirable to determine a pre-coding matrix for a scheduled time-frequency transmission slot that may not coincide with a best-M CQI/PMI feedback, to determine a suitable pre-coding matrix based on interpolating pre-coding matrices associated with best-M CQI/PMI feedback information.

In accordance with an embodiment of the invention, a method and system for best-M CQI feedback together with PMI feedback may comprise generating a plurality of feedback messages, as illustrated in FIG. 5, which may be communicated from a mobile station 304 to a base station 302, wherein at least one of the generated plurality of feedback messages may be associated with each corresponding selected one of a plurality of Channel Quality Indicator (CQI) reporting units. The at least one of the generated feedback messages may comprise CQI information and Pre-coding Matrix Index (PMI) information, as described for FIG. 4, which may both be associated with the selected one of the plurality of CQI reporting units. At least one other of the generated plurality of feedback messages may comprise an aggregate CQI information, the aggregate information based on one or more of the plurality of CQI reporting units illustrated in FIG. 5.

The aggregate CQI information may be generated, for example, based on an arithmetic mean of CQI information associated with the plurality of CQI reporting units, or on an arbitrary function of channel state information as described for FIG. 5. It may be determined whether a scheduled transmission corresponds to a time-frequency interval of selected one or more Cal reporting units, and a modulation type and/or a coding type, and a pre-coding matrix, may be selected for the scheduled transmission based on the determining and on CQI information and/or PMI information associated with a plurality of CQI reporting units, as described for FIG. 6. The modulation type, and/or coding type, and the pre-coding matrix may be selected for the scheduled transmission based on CQI information and/or PMI information associated with the selected CQI reporting unit when the scheduled transmission corresponds to the time-frequency interval of the selected one or more CQI reporting unit. When the scheduled transmission does not correspond to the time-frequency interval of the selected one or more CQI reporting unit, the modulation type and the coding type may be selected based on an aggregate CQI information, as described for FIG. 6. In these instances, the pre-coding matrices may be selected based on one or more of the plurality of CQI reporting units. The pre-coding matrix may be generated based on interpolation between a plurality of pre-coding matrices associated with a plurality of the selected one or more CQI reporting units, as described for FIG. 4 and FIG. 6. The plurality of the selected one or more CQI reporting units may be selected by choosing a plurality of nearest of the selected one or more CQI reporting units to the scheduled transmission, according to a distance metric, when the scheduled transmission does not correspond to the time-frequency interval, as illustrated in FIG. 6. The distance metric may be a difference in frequency and/or time. The pre-coding matrix may be selected from pre-coding matrices associated with the selected one or more CQI reporting units, when the scheduled transmission does not correspond to the time-frequency interval. In these instances, the pre-coding matrix may be selected by selecting a pre-coding matrix that may be associated with nearest of selected one or more CQI reporting unit to the scheduled transmission, according to a distance metric. The distance metric may be a difference in frequency and/or time.

Another embodiment of the invention may provide a machine-readable storage, having stored thereon, a computer program having at least one code section executable by a machine, thereby causing the machine to perform the steps as described above for a method and system for adaptive allocation of feedback resources for CQI and transmit pre-coding.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   generating a plurality of feedback messages, which is communicated from a mobile station to a base station, wherein:
   at least one of said generated plurality of feedback messages is associated with one of a plurality of Channel Quality Indicator (CQI) reporting units, said at least one of said generated feedback messages comprising CQI information and Pre-coding Matrix Index (PMI) information which are both associated with said one of said plurality of CQI reporting units; and
   at least one other of said generated plurality of feedback message comprises an aggregate CQI information, said aggregate CQI information being based on one or more of said plurality of CQI reporting units;
   determining whether a scheduled transmission corresponds to a time-frequency interval of one or more of said plurality of CQI reporting units; and
   selecting at least one of a modulation type, a coding type, and a pre-coding matrix for said scheduled transmission based on said determining and at least one of CQI information and PMI information associated with said one or more of said plurality of CQI reporting units.

2. The method according to claim 1, comprising selecting at least one of said modulation type, said coding type, and said pre-coding matrix for said scheduled transmission based on at least one of said CQI information and said PMI information associated with said one or more of said plurality of CQI reporting units when said scheduled transmission corresponds to said time-frequency interval of said one or more of said plurality of CQI reporting units.

3. The method according to claim 1, comprising selecting said modulation type and said coding type based on said aggregate CQI information when said scheduled transmission does not correspond to said time-frequency interval of said one or more of said plurality of CQI reporting units.

4. The method according to claim 3, comprising generating said aggregate CQI information based on an arithmetic mean of said CQI information associated with said one or more of said plurality of CQI reporting units.

5. The method according to claim 3, comprising generating said aggregate CQI information based on an arbitrary function of channel state information.

6. The method according to claim 1, comprising selecting said pre-coding matrix based on said one or more of said plurality of CQI reporting units when said scheduled transmission does not correspond to said time-frequency interval of said one or more of said plurality of CQI reporting units.

7. The method according to claim 6, comprising generating said selected pre-coding matrix, based on interpolation between a plurality of pre-coding matrices associated with a corresponding plurality of said one or more of said plurality of CQI reporting units, when said scheduled transmission does not correspond to said time-frequency interval of said one or more of said plurality of CQI reporting units.

8. The method according to claim 7, comprising selecting said plurality of said one or more of said plurality of CQI reporting units by choosing a plurality of nearest of said one or more of said plurality of CQI reporting units to said scheduled transmission, according to a distance metric, when said scheduled transmission does not correspond to said time-frequency interval of said one or more of said plurality of CQI reporting units.

9. The method according to claim 8, wherein said distance metric is based on a difference in at least one of frequency and time.

10. The method according to claim 1, comprising selecting said pre-coding matrix from a plurality of pre-coding matrices associated with said one or more of said plurality of CQI reporting units when said scheduled transmission does not correspond to said time-frequency interval.

11. The method according to claim 10, comprising selecting said pre-coding matrix by selecting a pre-coding matrix that is associated with a nearest of said one or more of said plurality of CQI reporting units to said scheduled transmission according to a distance metric.

12. The method according to claim 11, wherein said distance metric is based on a difference in at least one of frequency and time.

13. A system for processing communication signals, the system comprising:
one or more circuits configured to:
generate a plurality of feedback messages, which is communicated from a mobile station to a base station, wherein:
at least one of said generated plurality of feedback messages is associated with one of a plurality of Channel Quality Indicator (CQI) reporting units, said at least one of said generated feedback messages comprises CQI information and Pre-coding Matrix Index (PMI) information which are both associated with said one of said plurality of CQI reporting units; and
at least one other of said generated plurality of feedback message comprising an aggregate CQI information, said aggregate CQI information being based on one or more of said plurality of CQI reporting units;
determine whether a scheduled transmission corresponds to a time-frequency interval of said one or more of said plurality of CQI reporting units; and
select at least one of a modulation type, a coding type, and a pre-coding matrix for said scheduled transmission based on said determining and on CQI information and/or PMI information associated with said one or more of said plurality of CQI reporting units.

14. The system according to claim 13, wherein said one or more circuits are configured to select said at least one of said modulation type, said coding type, and said pre-coding matrix for said scheduled transmission based on at least one of said CQI information and PMI information associated with said one or more of said plurality of CQI reporting units when said scheduled transmission corresponds to said time-frequency interval of said one or more of said plurality of CQI reporting units.

15. The system according to claim 13, wherein said one or more circuits are further configured to select said modulation type and said coding type based on said aggregate CQI information when said scheduled transmission does not correspond to said time-frequency interval of said one or more of said plurality of CQI reporting units.

16. The system according to claim 15, wherein said one or more circuits are further configured to generate said aggregate CQI information based on an arithmetic mean of said CQI information associated with said one or more of said plurality of CQI reporting units.

17. The system according to claim 15, wherein said one or more circuits are further configured to generate said aggregate CQI information based on an arbitrary function of channel state information.

18. The system according to claim 13, wherein said one or more circuits are further configured to generate said pre-coding matrix, based on interpolation between a plurality of pre-coding matrices associated with said one or more of said plurality of CQI reporting units, when said scheduled transmission does not correspond to said time-frequency interval of said one or more of said plurality of CQI reporting units.

19. The system according to claim 13, wherein said one or more circuits are further configured to select said one or more of said plurality of CQI reporting units by choosing a plurality of nearest of said one or more of said plurality of CQI reporting units to said scheduled transmission, according to a distance metric, when said scheduled transmission does not correspond to said time-frequency interval of said one or more of said plurality of CQI reporting units.

20. The system according to claim 19, wherein said distance metric is based on a difference in at least one of frequency and time.

* * * * *